United States Patent
Choudhary et al.

(10) Patent No.: US 7,157,071 B2
(45) Date of Patent: Jan. 2, 2007

(54) PROCESS FOR PREPARING HYDROGEN PEROXIDE

(75) Inventors: Vasant Ramchandra Choudhary, Maharashtra (IN); Chanchal Samanta, Maharashtra (IN); Prabhas Jana, Maharashtra (IN)

(73) Assignee: Council of Scientitic and Industrial Research, New Delhi (IN)

( * ) Notice: Subject to any disclaimer, the term of this patent is extended or adjusted under 35 U.S.C. 154(b) by 357 days.

(21) Appl. No.: 10/879,501

(22) Filed: Jun. 30, 2004

(65) Prior Publication Data

US 2006/0002846 A1 Jan. 5, 2006

(51) Int. Cl.
*C01B 15/01* (2006.01)
(52) U.S. Cl. ...................................... 423/584
(58) Field of Classification Search ................. 423/584
See application file for complete search history.

(56) References Cited

OTHER PUBLICATIONS jGrinberg et al, "Ozone oxidation of hydrazine salts, N2H4.HNO3 and N2H4.H2SO4, in aqueous solutions", Zhurnal Neorganicheskoi Khimii (1968), 13 (8), 2039-42.*

* cited by examiner

*Primary Examiner*—Wayne A. Langel
(74) *Attorney, Agent, or Firm*—Nixon & Vanderhye P.C.

(57) ABSTRACT

The present invention discloses a process for the production of hydrogen peroxide from hydrazine hydrate or hydrazine salt, represented by a general formula:

$$N_2H_4 \cdot nX,$$

wherein, X is $H_2O$, $H_2SO_4$, $HNO_3$, HCl, HBr, HI or $CH_3COOH$; n is 0.5, 1 or 2; N is nitrogen; H is hydrogen; S is sulfur; Cl is chlorine; Br is bromine; and I is iodine, by its liquid phase oxidation with oxygen, using a solid catalyst comprising palladium but with or without halogen promoter, in an aqueous reaction medium with or without comprising a mineral acid and/or halide anions, which comprises:

i) contacting the solid catalyst with a hydrazine hydrate or hydrazine salt and oxygen containing gas selected from oxygen, air and oxygen enriched air, in aqueous reaction medium at the following reaction conditions: the concentration of hydrazine hydrate or hydrazine salt in the reaction medium above 0.001 mol/dm$^3$, the concentration of mineral acid in the reaction medium in the range from zero mol/dm$^3$ to 10 mol/dm$^3$, the concentration of halide anions added to the reaction medium in the range from zero mmol/dm$^3$ to 100 mmol/dm$^3$, the concentration of the solid catalyst in the reaction medium in the range from 0.01 g/dm$^3$ to 100 g/dm$^3$, the space velocity of the oxygen containing gas in the range from 100 cm$^3$/g catalyst/h to 100,000 cm$^3$/g catalyst/h, the mass ratio of hydrazine hydrate or hydrazine salt to solid catalyst in the range from 0.01 to 100, the temperature below 100° C., the pressure at least 0.95 atm, and the reaction contact time above 0.02 h; and ii) separating the $H_2O_2$ from the reaction mixture.

32 Claims, No Drawings

PROCESS FOR PREPARING HYDROGEN PEROXIDE

FIELD OF THE INVENTION

The present invention relates to a novel process for the production of hydrogen peroxide from a hydrazine compound such as a hydrazine hydrate or hydrazine salt. More particularly, this invention relates to a process for the production of hydrogen peroxide from hydrazine hydrate or hydrazine salt by its oxidation by oxygen using a solid catalyst comprising palladium with or without a halide promoter in the catalyst.

The process of this invention can be used in the chemical and petrochemical industries for the production of hydrogen peroxide by the oxidation of hydrazine hydrate or hydrazine salt by oxygen, using a solid catalyst comprising palladium with or without halogen promoter, in an environmentally clean manner.

BACKGROUND OF THE INVENTION

Hydrogen peroxide is an environmentally clean and versatile oxidizing agent used extensively in paper and pulp industries as a bleaching agent, for water purification and disinfection, for wastewater treatments and also in the preparation of fine/bulk chemicals by various oxidation processes. Currently most widely practiced commercial scale production of hydrogen peroxide is based on an auto oxidation process employing alkyl anthraquinone as the working material. This process involves reduction of alkyl anthraquinone dissolved in an organic working solution to alkyl anthraquinol. The alkyl anthraquinol is oxidized by air to produce hydrogen peroxide and alkyl anthraquinone, which is recycled in this process. This process comprises a number of operations involving reduction, oxidation, separation by aqueous extractions, refining and concentration, making the process complex. Apart from the requirements of high capital and operation costs, this process has following limitations and disadvantages:

Non-selective in hydrogenation, hence loss of anthraquinone.

Difficulties in separation hydrogenation catalyst and degradation products.

Need for the regenaration of used hydrogenation catalyst.

Need for the removal of organic matters from the extracted $H_2O_2$ solution.

Waste treatment and disposal of undesired side products of the cyclic process.

Demand for hydrogen peroxide has been increasing day-by-day for oxidizing organic compounds to value added products, waste-water treatment and water disinfection. Hence, there is a great practical need for replacing the anthraquinone process by an environmentally clean and more economic process. A number of processes based on the direct oxidation of hydrogen-to-hydrogen peroxide, using a solid catalyst comprising palladium, were disclosed in several patents, for example U.S. Pat. Nos. 4,681,751; 4,772,458; 4,832,938; 4,889,705; 5,135,731; 5,169,618; 5,399,334; 6,534,440; EP 504,741, A1; WO 9412428 A1; EP 621,235 A1; GE 4,172,918; JP 01133909 A2; EP 366419 A1; WO 9314025 A1. However, the direct oxidation of hydrogen-to-hydrogen peroxide is a highly hazardous process and hence inspite of the extensive invention, this process is not yet commercialized. Apart from its hazardous nature, the direct hydrogen-to-hydrogen peroxide oxidation processes have other limitations such as lower selectivity in the formation of hydrogen peroxide, use of highly corrosive liquid medium for the reaction and low concentration of hydrogen peroxide produced in the process.

Because of the limitations of the prior art processes for the production of hydrogen peroxide, there is a great practical need for developing a novel environ-friendly process for the production of hydrogen peroxide. The present invention was made for this purpose.

OBJECTS OF THE INVENTION

The main object of this invention was to provide a novel non-hazardous process for the production of hydrogen peroxide from hydrazine hydrate or hydrazine salt by its oxidation by oxygen in an aqueous reaction medium, using an easily separable and reusable solid catalyst, in an environmentally clean manner.

SUMMARY OF THE INVENTION

Accordingly, the present invention provides a process for the production of hydrogen peroxide from hydrazine hydrate or hydrazine salt of the formula $N_2H_4.nX$ wherein n is 0.5, 1 or 2; X is $H_2O$, $H_2SO_4$, $HNO_3$, HCl, HBr, HI or $CH_3COOH$; N is nitrogen; H is hydrogen; S is sulfur; Cl is chlorine; Br is bromine; and I is iodine, by liquid phase oxidation with oxygen, using a solid catalyst comprising palladium with or without halogen promoter, in an aqueous reaction medium with or without a mineral acid and/or halide anions, the process comprising:

i) contacting the solid catalyst with a hydrazine hydrate or hydrazine salt and oxygen containing gas selected from oxygen, air and oxygen enriched air, in aqueous reaction medium;

ii) separating the $H_2O_2$ from the reaction mixture.

In one embodiment of the invention, step (i) is carried out under the following reaction conditions: concentration of hydrazine hydrate or hydrazine salt in the reaction medium above 0.001 $mol/dm^3$, the concentration of mineral acid in the reaction medium in the range from zero $mol/dm^3$ to 10 $mol/dm^3$, the concentration of halide anions added to the reaction medium in the range from zero $mmol/dm^3$ to 100 $mmol/dm^3$, the concentration of the solid catalyst in the reaction medium in the range from 0.01 $g/dm^3$ to 100 $g/dm^3$, the space velocity of the oxygen containing gas in the range from 100 $cm^3$/g catalyst/h to 100,000 $cm^3$/g catalyst/h, the mass ratio of hydrazine hydrate or hydrazine salt to solid catalyst in the range from 0.01 to 100, the temperature below 100° C., the pressure at least 0.95 atm, and the reaction contact time above 0.02 h; and In another embodiment of the invention, the palladium catalyst may contain palladium metal with or without one or more of other noble metals, such as platinum, ruthenium, rhodium, iridium and osmium and also with or without one or more promoter metals, such as tin, gold and other metal promoters, supported on porous catalyst carriers, such as carbon, alumina, silica-alumina, silica, zeolites, zirconia, thoria, ceria and other metal oxides or mixed metal oxides in form of power, particles, pellets, extrudes or monolith or structured catalyst supports.

In another embodiment of the invention, the solid catalyst comprising palladium are Pd or PdO, with or without Au, Ag, or other transition metal or metal oxides, supported on porous solids, such as metal oxides, e.g. $Al_2O_3$, $SiO_2$, $ZrO_2$, $CeO_2$, $TiO_2$, $Y_2O_3$, $ThO_2$, $Ga_2O_3$, $B_2O_3$, and like or crystalline micro- or meso-porous zeolites, zeolite-like materials, such as metalosilicates or phosphates, known in the prior art. These catalysts may be prepared by impregnating palladium salt on the support or co-precipitation of mixed metal compounds, which on thermal decomposition are converted into oxides, followed by calcination at elevated temperature. The calcined catalysts may or may not be reduced by hydrogen, ammoniacal hydrazine or other methods known in the prior art. The concentration of palladium in the catalyst may be between 0.1 wt % and 10 wt %. Incorporation of halogen promoter in the solid catalyst of this invention may be carried out before or after the deposition of palladium on porous support used in the catalyst of this invention, by depositing halogen containing compound(s) on the catalyst or on the support by impregnating the halo compound(s) on the catalyst or the support, followed by calcination or passing vapor of the halo compound(s) over the catalyst or catalyst support. A number of inorganic or organic halo compounds, such as, ammonium halides, halogen halides and halo organic compounds are known in the prior art. A number of mineral acids, such as sulfuric acid, phosphoric acid, hydrochloric acid, hydrobromic acid, nitric acid and the like are known in the prior art.

In another embodiment of the invention, the preferred mineral acid in the reaction medium is orthophosphoric acid or sulfuric acid; the preferred concentration of mineral acid in the reaction medium is between zero mol/dm$^3$ and 1.0 mol/dm$^3$; the preferred concentration of hydrazine hydrate or hydrazine salt in the reaction medium is between 0.01 mol/dm$^3$ and 5.0 mol/dm$^3$; the preferred concentration of halide anions in the reaction medium is between zero mmol/dm$^3$ and 10.0 mmol/dm$^3$; the preferred concentration of the solid catalyst in the reaction medium is between 0.2 g/dm$^3$ and 10 g/dm$^3$; the preferred space velocity of oxygen containing gas is between 500 cm$^3$/g catalyst/h and 10,000 cm$^3$/g catalyst/h; the preferred reaction temperature is between 5° C. and 70° C.; the preferred reaction contact time is between 0.1 h and 5 h; the preferred X in the $N_2H_4.nX$ is $H_2SO_4$, HCl or $H_2O$; the preferred halogen promoter in the catalyst is bromine or chlorine; and the preferred halide anions in the reaction medium are bromide anions or chloride anions.

In yet another embodiment of the invention, step (i) of the process of this invention may be carried out in a stirred reactor, bubble column or packed bed reactor, all operated in a batch or continuous mode with respect to the liquid reaction medium.

In a further embodiment of the invention, in the continuous operation, the reaction medium may or may not be recycled in the reactor.

In yet another embodiment of the invention, in a stirred or bubble column reactor, the catalyst is in finely powdered form, whereas for a packed bed reactor, the catalyst may be in the form of granules of pellets.

In yet another embodiment of the inventnion, step (i) may also be carried out using a trickle bed reactor, with or without recycle of the liquid reaction medium, wherein in the trickle bed reactor, the solid catalyst is packed in the reactor and the liquid reaction medium is trickled over the catalyst, while gaseous reactant(s) are passed concurrently or counter-currently with respect to the liquid flow.

In another embodiment of the invention, the hydrazine salt can be prepared by reacting hydrazine hydrate with required amount of acid, such as HCl, $H_2SO_4$, HBr, $H_3PO_4$, $HNO_3$ or the like at room or lower temperature and using directly the resulting mixture for the reaction in step (i).

In another embodiment of the invention, the presence of halide promoter either in the catalyst or in the reaction medium is essential for the formation of hydrogen peroxide from hydrazine hydrate or hydrazine salt by its oxidation. However, when the adduct X in $N_2H_4.nX$ is an acid then the reaction medium may or may not contain a mineral acid. But, when the adduct X in $N_2H_4.nX$ is $H_2O$, then the presence of mineral acid in the reaction medium is essential.

In another embodiment of the invention, step (ii) of the process of this invention may be carried out by separating the solid catalyst from the reaction mixture by filtration or centrifugation and then separating the $H_2O_2$ from the liquid reaction mixture by filtration by distillation methods in the prior art.

In another embodiment of the invention, the hydrazine hydrate or hydrate salt, which is toxic in nature, is converted completely and hence no wastewater treatment for the destruction of hydrazine hydrate or hydrazine salt is necessary.

DETAILED DESCRIPTION OF THE INVENTION

The present invention invention provides a process for the production of hydrogen peroxide from hydrazine hydrate or hydrazine salt, represented by the formula $N_2H_4.nX$ wherein n is 0.5, 1 or 2; X is $H_2O$, $H_2SO_4$, $HNO_3$, HCl, HBr, HI or $CH_3COOH$; N is nitrogen; H is hydrogen; S is sulfur; Cl is chlorine; Br is bromine; and I is iodine, by its liquid phase oxidation with oxygen, using a solid catalyst comprising palladium with or without halogen promoter, in an aqueous reaction medium with or without a mineral acid and/or halide anions.

The process comprises:
i) contacting the solid catalyst with a hydrazine hydrate or hydrazine salt and oxygen containing gas selected from oxygen, air and oxygen enriched air, in aqueous reaction medium at the following reaction conditions:
the concentration of hydrazine hydrate or hydrazine salt in the reaction medium above 0.001 mol/dm$^3$, the concentration of mineral acid in the reaction medium in the range from zero mol/dm$^3$ to 10 mol/dm$^3$, the concentration of halide anions added to the reaction medium in the range from zero mmol/dm$^3$ to 100 mmol/dm$^3$, the concentration of the solid catalyst in the reaction medium in the range from 0.01 g/dm$^3$ to 100 g/dm$^3$, the space velocity of the oxygen containing gas in the range from 100 cm$^3$/g catalyst/h to 100,000 cm$^3$/g catalyst/h, the mass ratio of hydrazine hydrate or hydrazine salt to solid catalyst in the range from 0.01 to 100, the temperature below 100° C., the pressure at least 0.95 atm, and the reaction contact time above 0.02 h; and
ii) separating the $H_2O_2$ from the reaction mixture.

The palladium catalyst may contain a palladium metal with or without one or more of other noble metals, such as platinum, ruthenium, rhodium, iridium and osmium and also with or without one or more promoter metals, such as tin, gold and other metal promoters, supported on porous catalyst carriers, such as carbon, alumina, silica-alumina, silica, zeolites, zirconia, thoria, ceria and other metal oxides or mixed metal oxides in form of power, particles, pellets, extrudes or monolith or structured catalyst supports. Examples of the solid catalyst comprising palladium are Pd or PdO, with or without Au, Ag, or other transition metal or metal oxides, supported on porous solids, such as metal oxides, e.g. $Al_2O_3$, $SiO_2$, $ZrO_2$, $CeO_2$, $TiO_2$, $Y_2O_3$, $ThO_2$, $Ga_2O_3$, $B_2O_3$, and like or crystalline micro- or meso-porous zeolites, zeolite-like materials, such as metalosilicates or phosphates, known in the prior art. These catalysts may be prepared by impregnating palladium salt on the support or co-precipitation of mixed metal compounds, which on thermal decomposition are converted into oxides, followed by calcination at elevated temperature. The calcined catalysts may or may not be reduced by hydrogen, ammoniacal hydrazine or other methods known in the prior art. The concentration of palladium in the catalyst may be between 0.1 wt % and 10 wt %. Incorporation of halogen promoter in the solid catalyst of this invention may be carried out before or after the deposition of palladium on porous support used in the catalyst of this invention, by depositing halogen containing compound(s) on the catalyst or on the support by impregnating the halo compound(s) on the catalyst or the support, followed by calcination or passing vapor of the halo compound(s) over the catalyst or catalyst support. A number of inorganic or organic halo compounds, such as, ammonium halides, halogen halides and halo organic compounds are known in the prior art. A number of mineral acids, such as sulfuric acid, phosphoric acid, hydrochloric acid, hydrobromic acid, nitric acid and the like are known in the prior art.

In the process of this invention, the preferred mineral acid in the reaction medium is orthophosphoric acid or sulfuric acid; the preferred concentration of mineral acid in the reaction medium is between zero mol/dm$^3$ and 1.0 mol/dm$^3$; the preferred concentration of hydrazine hydrate or hydrazine salt in the reaction medium is between 0.01 mol/dm$^3$ and 5.0 mol/dm$^3$; the preferred concentration of halide anions in the reaction medium is between zero mmol/dm$^3$ and 10.0 mmol/dm$^3$; the preferred concentration of the solid catalyst in the reaction medium is between 0.2 g/dm$^3$ and 10 g/dm$^3$; the preferred space velocity of oxygen containing gas is between 500 cm$^3$/g catalyst/h and 10,000 cm$^3$/g catalyst/h; the preferred reaction temperature is between 5° C. and 70° C.; the preferred reaction contact time is between 0.1 h and 5 h; the preferred X in the $N_2H_4.nX$ is $H_2SO_4$, HCl or $H_2O$; the preferred halogen promoter in the catalyst is bromine or chlorine; and the preferred halide anions in the reaction medium are bromide anions or chloride anions.

Step (i) of the process of this invention may be carried out in a stirred reactor, bubble column or packed bed reactor, all operated in a batch or continuous mode with respect to the liquid reaction medium. In the continuous operation, the reaction medium may or may not be recycled in the reactor. For a stirred or bubble column reactor, the catalyst is in finely powdered form, whereas for a packed bed reactor, the catalyst may be in the form of granules of pellets. Step (i) may also be carried out using a trickle bed reactor known in the prior art, with or without recycle of the liquid reaction medium. In the trickle bed reactor, the solid catalyst is packed in the reactor and the liquid reaction medium is trickled over the catalyst, while gaseous reactant(s) are passed cocurrently or counter-currently with respect to the liquid flow.

In step (i) of the process of this invention, hydrazine hydrate or hydrazine salt and oxygen are reactants, which are dissolved in the reaction medium and the dissolved reactants react between themselves over the solid catalyst to produce hydrogen peroxide, nitrogen and water as the products. Both the by-product, nitrogen gas, and the side product, water, are environmentally benign. When hydrazine salt, $N_2H_4.nX$ (where $X=H_2O$, $H_2SO_4$, $HNO_3$, HCl, HBr, HI or $CH_3COOH$; n=0.5, 1 or 2; N is nitrogen, H is hydrogen, S is sulfur, Cl is chlorine, Br is bromine and I is iodine) is a reactant, the acid part of hydrazine salt, X, is released, at least partly, in the reaction medium. The role of the solid catalyst is to activate both the hydrazine hydrate or hydrazine salt and oxygen for selective oxidation of hydrazine hydrate or hydrazine salt by oxygen to hydrogen peroxide. The role of aqueous reaction medium is to dissolve both the reactants for the reaction to occur between the reactants over the catalyst. The role of mineral acid in the reaction medium is to reduce the decomposition of $H_2O_2$, which is formed in the reaction, to oxygen and water and also to reduce a reaction between $H_2O_2$ and $N_2H_4$ to water and $N_2$, and thereby increasing the $H_2O_2$ selectivity or yield in the process of this invention.

In the process of this invention, hydrazine salt can be prepared by reacting hydrazine hydrate with required amount of acid, such as HCl, $H_2SO_4$, HBr, $H_3PO_4$, $HNO_3$ or the like at room or lower temperature and using directly the resulting mixture for the reaction in step (i). In the process of this invention, the presence of halide promoter either in the catalyst or in the reaction medium is essential for the formation of hydrogen peroxide from hydrazine hydrate or hydrazine salt by its oxidation. However, when the adduct X in $N_2H_4.nX$ is an acid then the reaction medium may or may not contain a mineral acid. But, when the adduct X in $N_2H_4.nX$ is $H_2O$, then the presence of mineral acid in the reaction medium is essential.

Step (ii) of the process of this invention may be carried out by separating the solid catalyst from the reaction mixture by filtration or centrifugation and then separating the $H_2O_2$ from the liquid reaction mixture by filtration by distillation methods in the prior art.

In the process of this invention, hydrazine hydrate or hydrate salt, which is toxic in nature, can be converted completely and hence no wastewater treatment for the destruction of hydrazine hydrate or hydrazine salt is necessary. Moreover, the unconverted hydrazine hydrate or hydrazine salt present in the reaction mixture undergoes reaction with hydrogen peroxide, formed in the process of this invention, leading to the destruction of the unreacted hydrazine or hydrazine salt, present in the reaction mixture, by converting it into water and nitrogen, which are environmentally benign.

The main finding of this invention is that hydrogen peroxide with high selectivity and yield is produced in the liquid phase oxidation of hydrazine hydrate or hydrazine salt over a solid catalyst comprising palladium with or without halogen promoter in an aqueous reaction medium with or without comprising a mineral acid and/or halide anions, even at atmospheric pressure and room temperature. Other important finding of this invention is that the conversion of hydrazine hydrate or hydrogen salt in the process of this invention can be complete, 100%, and the by-products or side products formed in this process of this invention are water and nitrogen, which are environmentally benign, and hence the process occurs in an environmentally clean manner. Another important finding of this invention is that the catalyst of this invention can be easily separated, simply by filtration or centrifugation from the reaction mixture, and more over it can be reused repeatedly in this process of this invention. Yet another important finding of this invention is that, no explosive gas mixture is formed in this process of this invention and hence the process of this invention does not involve any explosion hazard.

The present invention is described with respect to the following examples illustrating the process of this invention for the production of hydrogen peroxide from hydrazine hydrate or hydrazine salt. These examples are provided for illustrative purposes only and therefore should not be construed to limit the scope of the present invention.

Definition of Terms Used in the Examples

Conversion of hydrazine hydrate or hydrazine salt (%)=mole % of the hydrazine hydrate or hydrazine salt converted to all products Selectivity for $H_2O_2$ (%)=[(Moles of $H_2O_2$ formed/Moles of hydrazine hydrate or hydrazine salt converted)÷2]×100

Yield of $H_2O_2$ (%)=[(Moles of $H_2O_2$ formed per mole of hydrazine hydrate or hydrazine salt present in the reaction medium)÷2]×100

The flow rate of gases is measured at 0° C. and 1 atm pressure. Gas hourly space velocity (GHSV) is a volume of gas, measured at 0° C. and 1 atm pressure, passed through the reactor per unit mass of catalyst per hour.

EXAMPLES-1 TO 27

These examples illustrate the process of this invention for the production of hydrogen peroxide from hydrazine hydrate or hydrazine salt by its oxidation by oxygen, using a solid catalyst comprising palladium, with or without a halogen promoter, in an aqueous reaction medium with or without comprising acid or halide anions.

The process of this invention was carried out in a magnetically stirred jacketed glass reactor of capacity 100 cm$^3$ or 250 cm$^3$, containing 50 cm$^3$ or 150 cm$^3$ aqueous reaction medium with or without comprising mineral acid or halide anions, to which a known quantity of hydrazine hydrate or hydrazine salt and a solid catalyst comprising palladium with or without halide promoter (s) were added, under vigorous stirring, while bubbling pure oxygen or air through the reaction medium, at the reaction conditions given in Table 1. The temperature of the reaction was controlled by passing continuously water from thermostatic bath through the jacketed reactor. After the reaction, the solid catalyst from the reaction mixture was separated by filtration and the filtrate was analyzed for its hydrogen peroxide and hydrazine hydrate or hydrazine salt contents. The hydrogen peroxide was analyzed by iodometric titration and the unconverted hydrazine hydrate or hydrazine salt was analyzed by potassium iodate titration. Both the titration methods are well known in the prior art.

The results are presented in Table 1.

The Pd (1%)/$Al_2O_3$, Pd (5%)/$Al_2O_3$ and Pd (5%)/C catalysts were obtained from Lancaster, UK. The other solid catalysts were prepared as follows. Br (1%)/ Pd (5%)/$Al_2O_3$: The Pd (5%)/$Al_2O_3$ was impregnated with ammonium bromide by mixing 5 g Pd /$Al_2O_3$ with 13.3 ml aqueous solution containing 0.63 mmol ammonium bromide and drying the wet mass on water bath to get the impregnated Pd/$Al_2O_3$. The impregnated Pd/$Al_2O_3$ catalyst was calcined in a tubular quartz reactor in a flow of nitrogen (20 cm$^3$/min) at 400° C. for 1 h.

F (1%)/Br (1%)/Pd (5%)/$Al_2O_3$: The Br (1%)/Pd (5%)/$Al_2O_3$ catalyst was impregnated with ammonium fluoride by mixing 2 g Br (1%)/Pd (5%)/$Al_2O_3$ with 5.4 ml aqueous solution containing 1.05 mmol ammonium fluoride and drying the wet mass on water bath to get the impregnated Br (1%)/Pd (5%)/$Al_2O_3$. The fluoride impregnated Br (1%)/Pd (5%)/$Al_2O_3$ was calcined in a tulular quartz reactor in a flow of nitrogen (20 cm$^3$/min) at 400° C. for 1 h.

The solid catalysts comprising palladium—Pd (2.5%)/$ZrO_2$, Pd (2.5%)/$Ga_2O_3$, Pd (2.5%)/$CeO_2$ were prepared by impregnating 1.0 g $ZrO_2$ or $Ga_2O_3$ or $CeO_2$ with 0.25 mmol palladium acetate from its acetonitrile solution, drying on water bath under stirring, calcining at 500° C. for 3 h and then reducing by ammoniacal hydrazine at room temperature, followed by washing with pure water and drying the resulting catalyst.

The results from Examples—25, 26 and 27 show that the catalyst of the process of this invention can be reused repeatedly in the process of this invention.

TABLE 1

Result of the direct oxidation of hydrazine hydrate or hydrazine salt by oxygen to hydrogen peroxide, RM = Reaction Medium

|  | Example-1 | Example-2 | Example-3 |
|---|---|---|---|
| Reaction Conditions |  |  |  |
| Reactor capacity (cm$^3$) | 100 | 100 | 100 |
| Volume of RM (cm$^3$) | 50 | 50 | 50 |
| Acid in RM | Nil | Nil | Nil |
| Concentration of acid in RM (mol/dm$^3$) | — | — | — |
| Halide in RM | Nil | Nil | Nil |
| Concentration of halide in RM (mmol/dm$^3$) | — | — | — |
| $N_2H_4$.nX | $N_2H_4$.$H_2SO_4$ | $N_2H_4$.$H_2SO_4$ | $N_2H_4$.$H_2SO_4$ |
| Concentration of $N_2H_4$.nX in RM (mol/dm$^3$) | 0.12 | 0.05 | 0.05 |
| Catalyst | Br (1%)/Pd (5%)/$Al_2O_3$ | Br (1%)/Pd (5%) $Al_2O_3$ | Br (1%)/Pd (5%)/$Al_2O_3$ |
| Concentration of catalyst in RM (g/dm$^3$) | 2.0 | 2.0 | 2.0 |
| $O_2$ containing gas | Pure $O_2$ | Pure $O_2$ | Pure $O_2$ |
| GHSV of $O_2$ containing gas (cm$^3$/g catalyst/h) | 6000 | 6000 | 6000 |
| Temperature (° C.) | 25 | 16 | 5 |
| Pressure (atm) | 1.0 | 1.0 | 1.0 |
| Reaction time (h) | 1.0 | 1.0 | 1.0 |
| Results of $N_2H_4$.X to $H_2O_2$ Oxidation |  |  |  |
| Conversion of $N_2H_4$.nX (%) | 100 | 100 | 100 |
| $H_2O_2$ produced per mole of $N_2H_4$.nX in RM (mol per mol) | 1.04 | 1.5 | 1.0 |
| $H_2O_2$ produced per mole of $N_2H_4$.nX converted (mol per mol) | 1.04 | 1.5 | 1.0 |

TABLE 1-continued

Result of the direct oxidation of hydrazine hydrate or hydrazine salt by oxygen to hydrogen peroxide, RM = Reaction Medium

| | | | |
|---|---|---|---|
| $H_2O_2$ yield (%) | 52 | 75 | 50 |
| $H_2O_2$ selectivity (%) | 52 | 75 | 50 |

| | Example-4 | Example-5 | Example-6 |
|---|---|---|---|
| Reaction Conditions | | | |
| Reactor capacity ($cm^3$) | 100 | 100 | 100 |
| Volume of RM ($cm^3$) | 50 | 50 | 50 |
| Acid in RM | Nil | $H_3PO_4$ | $H_3PO_4$ |
| Concentration of acid in RM (mol/$dm^3$) | — | 0.1 | 1.0 |
| Halide in RM | Nil | Nil | Nil |
| Concentration of halide in RM (mmol/$dm^3$) | — | — | — |
| $N_2H_4.nX$ | $N_2H_4.H_2SO_4$ | $N_2H_4.H_2SO_4$ | $N_2H_4.H_2SO_4$ |
| Concentration of $N_2H_4.nX$ in RM (mol/$dm^3$) | 0.05 | 0.05 | 0.05 |
| Catalyst | Br (1%)/Pd (5%)/$Al_2O_3$ | Br (1%)/Pd (5%)/$Al_2O_3$ | Br (1%)/Pd (5%)/$Al_2O_3$ |
| Concentration of catalyst in RM (g/$dm^3$) | 2.0 | 2.0 | 2.0 |
| $O_2$ containing gas | Pure $O_2$ | Pure $O_2$ | Pure $O_2$ |
| GHSV of $O_2$ containing gas ($cm^3$/g catalyst/h) | 6000 | 6000 | 6000 |
| Temperature (° C.) | 65 | 27 | 27 |
| Pressure (atm) | 1.0 | 1.0 | 1.0 |
| Reaction time (h) | 1.0 | 1.0 | 1.0 |
| Results of $N_2H_4.X$ to $H_2O_2$ Oxidation | | | |
| Conversion of $N_2H_4.nX$ (%) | 100 | 100 | 100 |
| $H_2O_2$ produced per mole of $N_2H_4.nX$ in RM (mol per mol) | 0.13 | 1.3 | 1.4 |
| $H_2O_2$ produced per mole of $N_2H_4.nX$ converted (mol per mol) | 0.13 | 1.3 | 1.4 |
| $H_2O_2$ yield (%) | 6.3 | 65 | 70 |
| $H_2O_2$ selectivity (%) | 6.3 | 65 | 70 |

| | Example-7 | Example-8 | Example-9 |
|---|---|---|---|
| Reaction Conditions | | | |
| Reactor capacity ($cm^3$) | 100 | 100 | 250 |
| Volume of RM ($cm^3$) | 50 | 50 | 150 |
| Acid in RM | Nil | Nil | Nil |
| Concentration of acid in RM (mol/$dm^3$) | — | — | — |
| Halide in RM | Nil | Nil | Nil |
| Concentration of halide in RM (mmol/$dm^3$) | — | — | — |
| $N_2H_4.nX$ | $N_2H_4.H_2SO_4$ | $N_2H_4.H_2SO_4$ | $N_2H_4.H_2SO_4$ |
| Concentration of $N_2H_4.nX$ in RM (mol/$dm^3$) | 0.05 | 0.31 | 0.08 |
| Catalyst | Br (1%)/Pd (5%)/$Al_2O_3$ | Br (1%)/Pd (5%)/$Al_2O_3$ | Br (1%)/Pd (5%)/$Al_2O_3$ |
| Concentration of catalyst in RM (g/$dm^3$) | 2.0 | 2.0 | 3.3 |
| $O_2$ containing gas | Pure $O_2$ | Pure $O_2$ | Pure $O_2$ |
| GHSV of $O_2$ containing gas ($cm^3$/g catalyst/h) | 6000 | 6000 | 2400 |
| Temperature (° C.) | 25 | 25 | 26 |
| Pressure (atm) | 0.95 | 0.95 | 1.1 |
| Reaction time (h) | 0.2 | 2.0 | 1.5 |
| Results of $N_2H_4.X$ to $H_2O_2$ Oxidation | | | |
| Conversion of $N_2H_4.nX$ (%) | 52.3 | 90 | 100 |
| $H_2O_2$ produced per mole of $N_2H_4.nX$ in RM (mol per mol) | 0.51 | 0.46 | 0.99 |
| $H_2O_2$ produced per mole of $N_2H_4.nX$ converted (mol per mol) | 0.98 | 0.51 | 0.99 |
| $H_2O_2$ yield (%) | 25.5 | 22.8 | 49.5 |
| $H_2O_2$ selectivity (%) | 48.8 | 25.5 | 49.5 |

| | Example-10 | Example-11 | Example-12 |
|---|---|---|---|
| Reaction Conditions | | | |
| Reactor capacity ($cm^3$) | 100 | 100 | 100 |
| Volume of RM ($cm^3$) | 50 | 50 | 50 |
| Acid in RM | Nil | Nil | Nil |
| Concentration of acid in RM (mol/$dm^3$) | — | — | — |
| Halide in RM | Nil | KBr | KBr |
| Concentration of halide in RM (mmol/$dm^3$) | — | 1.0 | 8.9 |
| $N_2H_4.nX$ | $N_2H_4.H_2SO_4$ | $N_2H_4.H_2SO_4$ | $N_2H_4.H_2SO_4$ |

TABLE 1-continued

Result of the direct oxidation of hydrazine hydrate or hydrazine salt by oxygen to hydrogen peroxide, RM = Reaction Medium

| | | | |
|---|---|---|---|
| Concentration of $N_2H_4.nX$ in RM (mol/dm$^3$) | 0.05 | 0.05 | 0.05 |
| Catalyst | F (1%)/Br (1%)/Pd (5%)/Al$_2$O$_3$ | Pd (5%)/Al$_2$O$_3$ | Pd (5%)/Al$_2$O$_3$ |
| Concentration of catalyst in RM (g/dm$^3$) | 2.0 | 2.0 | 2.0 |
| O$_2$ containing gas | Pure O$_2$ | Pure O$_2$ | Pure O$_2$ |
| GHSV of O$_2$ containing gas (cm$^3$/g catalyst/h) | 10,000 | 4000 | 4000 |
| Temperature (° C.) | 24 | 26 | 26 |
| Pressure (atm) | 1.0 | 1.1 | 1.1 |
| Reaction time (h) | 1.0 | 1.0 | 1.0 |
| Results of $N_2H_4.X$ to $H_2O_2$ Oxidation | | | |
| Conversion of $N_2H_4.nX$ (%) | 100 | 100 | 100 |
| $H_2O_2$ produced per mole of $N_2H_4.nX$ in RM (mol per mol) | 1.0 | 1.16 | 1.36 |
| $H_2O_2$ produced per mole of $N_2H_4.nX$ converted (mol per mol) | 1.0 | 1.16 | 1.36 |
| $H_2O_2$ yield (%) | 50 | 58 | 68 |
| $H_2O_2$ selectivity (%) | 50 | 58 | 68 |

| | Example-13 | Example-14 | Example-15 |
|---|---|---|---|
| Reaction Conditions | | | |
| Reactor capacity (cm$^3$) | 100 | 100 | 100 |
| Volume of RM (cm$^3$) | 50 | 50 | 50 |
| Acid in RM | H$_3$PO$_4$ | H$_2$SO$_4$ | H$_3$PO$_4$ |
| Concentration of acid in RM (mol/dm$^3$) | 0.1 | 0.04 | 0.1 |
| Halide in RM | Nil | Nil | Nil |
| Concentration of halide in RM (mmol/dm$^3$) | — | — | — |
| $N_2H_4.nX$ | $N_2H_4.H_2O$ | $N_2H_4.H_2O$ | $N_2H_4.H_2O$ |
| Concentration of $N_2H_4.nX$ in RM (mol/dm$^3$) | 0.084 | 0.084 | 0.084 |
| Catalyst | F (1%)/Br (1%)/Pd (5%)/Al$_2$O$_3$ | Br (1%)/Pd (5%)/Al$_2$O$_3$ | Br (1%)/Pd (5%)/Al$_2$O$_3$ |
| Concentration of catalyst in RM (g/dm$^3$) | 2.0 | 2.0 | 2.0 |
| O$_2$ containing gas | Pure O$_2$ | Pure O$_2$ | Pure O$_2$ |
| GHSV of O$_2$ containing gas (cm$^3$/g catalyst/h) | 6000 | 6000 | 1080 |
| Temperature (° C.) | 27 | 27 | 27 |
| Pressure (atm) | 1.05 | 1.05 | 1.05 |
| Reaction time (h) | 1.0 | 0.5 | 1.0 |
| Results of $N_2H_4.X$ to $H_2O_2$ Oxidation | | | |
| Conversion of $N_2H_4.nX$ (%) | 100 | 100 | 65 |
| $H_2O_2$ produced per mole of $N_2H_4.nX$ in RM (mol per mol) | 0.75 | 0.42 | 0.1 |
| $H_2O_2$ produced per mole of $N_2H_4.nX$ converted (mol per mol) | 0.75 | 0.42 | 0.15 |
| $H_2O_2$ yield (%) | 37.5 | 21 | 4.9 |
| $H_2O_2$ selectivity (%) | 37.5 | 21 | 7.8 |

| | Example-16 | Example-17 | Example-18 |
|---|---|---|---|
| Reaction Conditions | | | |
| Reactor capacity (cm$^3$) | 250 | 100 | 100 |
| Volume of RM (cm$^3$) | 150 | 50 | 50 |
| Acid in RM | H$_3$PO$_4$ | H$_3$PO$_4$ | HCl |
| Concentration of acid in RM (mol/dm$^3$) | 0.33 | 0.1 | 0.1 |
| Halide in RM | KBr | Nil | HCl |
| Concentration of halide in RM (mmol/dm$^3$) | 0.93 | — | 170 |
| $N_2H_4.nX$ | $N_2H_4.H_2O$ | $N_2H_4.H_2O$ | $N_2H_4.H_2O$ |
| Concentration of $N_2H_4.nX$ in RM (mol/dm$^3$) | 0.14 | 0.084 | 0.084 |
| Catalyst | Pd (5%)/Al$_2$O$_3$ | Cl (5%)/Pd (5%)/Carbon | Pd (5%)/Carbon |
| Concentration of catalyst in RM (g/dm$^3$) | 3.3 | 2.0 | 2.0 |
| O$_2$ containing gas | Pure O$_2$ | Pure O$_2$ | Air |
| GHSV of O$_2$ containing gas (cm$^3$/g catalyst/h) | 3600 | 6000 | 600 |
| Temperature (° C.) | 27 | 27 | 26 |

TABLE 1-continued

Result of the direct oxidation of hydrazine hydrate or hydrazine salt by oxygen to hydrogen peroxide, RM = Reaction Medium

| | | | |
|---|---|---|---|
| Pressure (atm) | 1.05 | 1.05 | 1.02 |
| Reaction time (h) | 1.0 | 0.5 | 0.5 |
| Results of $N_2H_4 \cdot X$ to $H_2O_2$ Oxidation | | | |
| Conversion of $N_2H_4 \cdot nX$ (%) | 100 | 80 | 100 |
| $H_2O_2$ produced per mole of $N_2H_4 \cdot nX$ in RM (mol per mol) | 0.65 | 0.26 | 0.18 |
| $H_2O_2$ produced per mole of $N_2H_4 \cdot nX$ converted (mol per mol) | 0.65 | 0.33 | 0.18 |
| $H_2O_2$ yield (%) | 32.5 | 13.0 | 9.0 |
| $H_2O_2$ selectivity (%) | 32.5 | 16.5 | 9.0 |

| | Example-19 | Example-20 | Example-21 |
|---|---|---|---|
| Reaction Conditions | | | |
| Reactor capacity (cm$^3$) | 250 | 250 | 250 |
| Volume of RM (cm$^3$) | 150 | 150 | 150 |
| Acid in RM | $H_3PO_4$ | $H_3PO_4$ | $H_3PO_4$ |
| Concentration of acid in RM (mol/dm$^3$) | 0.33 | 0.33 | 0.33 |
| Halide in RM | KBr | KBr | KBr |
| Concentration of halide in RM (mmol/dm$^3$) | 1.87 | 0.93 | 0.93 |
| $N_2H_4 \cdot nX$ | $N_2H_4 \cdot H_2O$ | $N_2H_4 \cdot H_2O$ | $N_2H_4 \cdot H_2O$ |
| Concentration of $N_2H_4 \cdot nX$ in RM (mol/dm$^3$) | 0.14 | 0.14 | 0.14 |
| Catalyst | Pd (1%)/ $Al_2O_3$ | Pd (2.5%)/ $ZrO_2$ | Pd (2.5%)/ $Ga_2O_3$ |
| Concentration of catalyst in RM (g/dm$^3$) | 3.3 | 3.3 | 3.3 |
| $O_2$ containing gas | Pure $O_2$ | Pure $O_2$ | Pure $O_2$ |
| GHSV of $O_2$ containing gas (cm$^3$/g catalyst/h) | 3600 | 3600 | 3600 |
| Temperature (°C.) | 25 | 25 | 25 |
| Pressure (atm) | 1.0 | 1.0 | 1.0 |
| Reaction time (h) | 2.0 | 2.0 | 2.0 |
| Results of $N_2H_4 \cdot X$ to $H_2O_2$ Oxidation | | | |
| Conversion of $N_2H_4 \cdot nX$ (%) | 100 | 80 | 100 |
| $H_2O_2$ produced per mole of $N_2H_4 \cdot nX$ in RM (mol per mol) | 0.62 | 0.44 | 0.51 |
| $H_2O_2$ produced per mole of $N_2H_4 \cdot nX$ converted (mol per mol) | 0.62 | 0.55 | 0.51 |
| $H_2O_2$ yield (%) | 31.0 | 22 | 25.5 |
| $H_2O_2$ selectivity (%) | 31.0 | 27.5 | 25.5 |

| | Example-22 | Example-23 | Example-24 |
|---|---|---|---|
| Reaction Conditions | | | |
| Reactor capacity (cm$^3$) | 250 | 100 | 100 |
| Volume of RM (cm$^3$) | 150 | 50 | 50 |
| Acid in RM | $H_3PO_4$ | Nil | $H_3PO_4$ |
| Concentration of acid in RM (mol/dm$^3$) | 0.33 | — | 0.1 |
| Halide in RM | KBr | KBr | Nil |
| Concentration of halide in RM (mmol/dm$^3$) | 0.93 | 0.93 | — |
| $N_2H_4 \cdot nX$ | $N_2H_4 \cdot H_2O$ | $N_2H_4 \cdot H_2O$ | $N_2H_4 \cdot H_2O$ |
| Concentration of $N_2H_4 \cdot nX$ in RM (mol/dm$^3$) | 0.14 | 0.08 | 0.08 |
| Catalyst | Pd (2.5%)/ $CeO_2$ | Pd (5%)/ $Al_2O_3$ | Pd (5%)/ $Al_2O_3$ |
| Concentration of catalyst in RM (g/dm$^3$) | 3.3 | 2.0 | 2.0 |
| $O_2$ containing gas | Pure $O_2$ | Pure $O_2$ | Pure $O_2$ |
| GHSV of $O_2$ containing gas (cm$^3$/g catalyst/h) | 3600 | 6000 | 6000 |
| Temperature (°C.) | 25 | 27 | 27 |
| Pressure (atm) | 1.0 | 1.0 | 1.0 |
| Reaction time (h) | 2.0 | 1.0 | 1.0 |
| Results of $N_2H_4 \cdot X$ to $H_2O_2$ Oxidation | | | |
| Conversion of $N_2H_4 \cdot nX$ (%) | 75 | 100 | 100 |
| $H_2O_2$ produced per mole of $N_2H_4 \cdot nX$ in RM (mol per mol) | 0.38 | Zero | Zero |
| $H_2O_2$ produced per mole of $N_2H_4 \cdot nX$ converted | 0.51 | Zero | Zero |

TABLE 1-continued

Result of the direct oxidation of hydrazine hydrate or hydrazine salt by oxygen to hydrogen peroxide, RM = Reaction Medium

| (mol per mol) | | | |
|---|---|---|---|
| $H_2O_2$ yield (%) | 19.0 | Zero | Zero |
| $H_2O_2$ selectivity (%) | 25.5 | Zero | Zero |

| | Example-25 | Example-26 | Example-27 |
|---|---|---|---|
| Reaction Conditions | | | |
| Reactor capacity (cm³) | 100 | 100 | 100 |
| Volume of RM (cm³) | 50 | 50 | 50 |
| Acid in RM | Nil | Nil | $H_3PO_4$ |
| Concentration of acid in RM (mol/dm³) | — | — | 0.1 |
| Halide in RM | Nil | Nil | Nil |
| Concentration of halide in RM (mmol/dm³) | — | — | — |
| $N_2H_4 \cdot nX$ | $N_2H_4 \cdot H_2SO_4$ | $N_2H_4 \cdot H_2SO_4$ | $N_2H_4 \cdot H_2O$ |
| Concentration of $N_2H_4 \cdot nX$ in RM (mol/dm³) | 0.05 | 0.05 | 0.08 |
| Catalyst | Catalyst after use in Example-2 | Catalyst after use in Example-25 | Catalyst after use in Example-26 |
| Concentration of catalyst in RM (g/dm³) | 2.0 | 2.0 | 2.0 |
| $O_2$ containing gas | Pure $O_2$ | Pure $O_2$ | Pure $O_2$ |
| GHSV of $O_2$ containing gas (cm³/g catalyst/h) | 6000 | 6000 | 6000 |
| Temperature (° C.) | 26 | 18 | 27 |
| Pressure (atm) | 1.1 | 1.0 | 1.0 |
| Reaction time (h) | 1.0 | 1.0 | 1.0 |
| Results of $N_2H_4 \cdot X$ to $H_2O_2$ Oxidation | | | |
| Conversion of $N_2H_4 \cdot nX$ (%) | 100 | 100 | 100 |
| $H_2O_2$ produced per mole of $N_2H_4 \cdot nX$ in RM (mol per mol) | 1.02 | 1.4 | 0.6 |
| $H_2O_2$ produced per mole of $N_2H_4 \cdot nX$ converted (mol per mol) | 1.02 | 1.4 | 0.6 |
| $H_2O_2$ yield (%) | 51 | 70 | 30 |
| $H_2O_2$ selectivity (%) | 51 | 70 | 30 |

EXAMPLE-28

This example illustrates the process of this invention for the production of hydrogen peroxide from hydrazine salt, $N_2H_4 \cdot H_2SO_4$, prepared by reacting hydrazine hydrate, $N_2H_4 \cdot H_2O$, with $H_2SO_4$.

The process was carried out by the procedure and the reaction conditions same as that describe in Example-1 except that, instead of using $N_2H_4 \cdot H_2SO_4$ salt, a mixture prepared by reacting hydrazine hydrate with an Equimolar amounts of concentrated $H_2SO_4$ at 5° C. and the resulting mixture was used in step (i) and also the reaction in step (i) was carried out for 0.5 h instead of for 1.0 h. The results obtained were as follows.

| | |
|---|---|
| Conversion of $N_2H_4 \cdot nX$ (%) = | 100 |
| $H_2O_2$ produced per mole of $N_2H_4 \cdot X$ in RM (mol per mol) = | 1.16 |
| $H_2O_2$ yield (%) = | 58.0 |
| $H_2O_2$ selectivity (%) = | 58.0 |

EXAMPLE-29

This example illustrates the process of this invention for the production of hydrogen peroxide from hydrazine salt, $N_2H_4 \cdot 2HCl$, prepared by reacting hydrazine hydrate, $N_2H_4 \cdot H_2O$, with HCl.

The process was carried out by the procedure and at the reaction conditions same as that described in Example-28 except that, the hydrazine hydrate was reacted with twice Equimolar amounts of concentrated HCl instead of an equimolar amounts of concentrated $H_2SO_4$. The results obtained were as follows.

| | |
|---|---|
| Conversion of $N_2H_4 \cdot nX$ (%) = | 100 |
| $H_2O_2$ produced per mole of $N_2H_4 \cdot X$ in RM (mol per mol) = | 1.07 |
| $H_2O_2$ yield (%) = | 53.5 |
| $H_2O_2$ selectivity (%) = | 53.5 |

Novel Important Features and Major Advantages of the Process of this Invention over the Prior Art Processes for the Production of Hydrogen Peroxide are as Follows:

1. The process of this invention involves a liquid phase oxidation of hydrazine hydrate or hydrazine salt by oxygen in an aqueous reaction medium for the production of hydrogen peroxide with upto 100% conversion of hydrazine hydrate salt to $H_2O_2$, water and $N_2$.
2. In the process of this invention, the by products and side products formed are nitrogen and water, and hence, the process is environmentally benign.
3. In the process of this invention, selective oxidation by oxygen of hydrazine hydrate or hydrazine salt in an aqueous reaction medium over solid catalyst comprising palladium occurs only if an halide promoter is present either in the reaction medium or in the catalyst itself, but for the selective oxidation of hydrazine hydrate to hydrogen peroxide, in addition to the presence of halide promoter in the reaction medium or in the solid catalyst, the presence of a mineral acid in the reaction medium is also essential.

4. Unlike the presently practiced anthraquinone process for the production of hydrogen peroxide, the process of this invention involves only a single reaction step and produces no side product(s), which needs wastewater treatment.

5. Unlike the prior art processes based on the direct oxidation of hydrogen by oxygen for the production of hydrogen peroxide, the process of this invention is non-hazardous.

6. In the process of this invention, hydrazine salt can be oxidized selectivity to hydrogen peroxide even using pure water, as the reaction medium.

We claim:

1. A process for the production of hydrogen peroxide from a hydrazine compound by liquid phase oxidation with oxygen, using a solid catalyst comprising palladium with or without halogen promoter, in an aqueous reaction medium with or without a mineral acid and/or halide anions, the process comprising:
   i) contacting the solid catalyst with the hydrazine compound and oxygen containing gas selected from the group consisting of oxygen, air and oxygen enriched air, in aqueous reaction medium;
   ii) separating the $H_2O_2$ from the reaction mixture.

2. A process as claimed in claim 1 wherein the hydrazine compound is selected from the group consisting of hydrazine hydrate and hydrazine salt of the formula $N_2H_4.nX$ wherein n is 0.5, 1 or 2; X is $H_2O$, $H_2SO_4$, $HNO_3$, HCl, HBr, HI or $CH_3COOH$; N is nitrogen; H is hydrogen; S is sulfur; Cl is chlorine; Br is bromine; and I is iodine.

3. A process as claimed in claim 1 wherein step (i) is carried out under the following reaction conditions: concentration of hydrazine hydrate or hydrazine salt in the reaction medium above 0.001 $mol/dm^3$, the concentration of mineral acid in the reaction medium in the range from zero $mol/dm^3$ to 10 $mol/dm^3$, the concentration of halide anions added to the reaction medium in the range from zero $mmol/dm^3$ to 100 $mmol/dm^3$, the concentration of the solid catalyst in the reaction medium in the range from 0.01 $g/dm^3$ to 100 $g/dm^3$, the space velocity of the oxygen containing gas in the range from 100 $cm^3$/g catalyst/h to 100,000 $cm^3$/g catalyst/h, the mass ratio of hydrazine hydrate or hydrazine salt to solid catalyst in the range from 0.01 to 100, the temperature below 100° C., the pressure at least 0.95 atm, and the reaction contact time above 0.02 h.

4. A process as claimed in claim 1 wherein the palladium catalyst contains one or more of other noble metals selected from the group consisting of platinum, ruthenium, rhodium, iridium and osmium and also one or more promoter metals selected from the group consisting of tin and gold, and is supported on a porous catalyst carrier selected from the group consisting of carbon, alumina, silica-alumina, silica, zeolites, zirconia, thoria, ceria and metal oxides or mixed metal oxides in form of powder, particles, pellets, extrudes or monolith or structured catalyst supports.

5. A process as claimed in claim 1 wherein palladium catalyst is selected from the group consisting of Pd and PdO with or without Au, Ag, or other transition metal or metal oxides, supported on porous solids comprising metal oxides selected from the group consisting of $Al_2O_3$, $SiO_2$, $ZrO_2$, $CeO_2$, $TiO_2$, $Y_2O_3$, $ThO_2$, $Ga_2O_3$, and $B_2O_3$, or crystalline micro- or meso-porous zeolites and zeolite-like materials selected from the group consisting of metalosilicates and phosphates.

6. A process as claimed in claim 1 wherein the catalyst is prepared by impregnating palladium salt on a support or by co-precipitation of mixed metal compounds, which on thermal decomposition are converted into oxides, followed by calcination at elevated temperature.

7. A process as claimed in claim 6 wherein the calcined catalyst is reduced by hydrogen or ammoniacal hydrazine.

8. A process as claimed in claim 1 wherein the concentration of palladium in the catalyst is in the range of 0.1 wt % and 10 wt %.

9. A process as claimed in claim 1 wherein the halogen promoter in the solid catalyst of this invention is included before or after the deposition of palladium on porous support used in the catalyst by depositing halogen containing compound(s) on the catalyst or on the support by impregnating the halo compound(s) on the catalyst or the support, followed by calcination or passing vapor of the halo compound(s) over the catalyst or catalyst support.

10. A process as claimed in claim 9 wherein the halogen compound is selected from the group consisting of inorganic and organic halo compounds selected from the group consisting of ammonium halides, halogen halides and halo organic compounds.

11. A process as claimed in claim 1 wherein the mineral acids is selected from the group consisting of sulfuric acid, phosphoric acid, hydrochloric acid, hydrobromic acid and nitric acid.

12. A process as claimed in claim 1 wherein the mineral acid is orthophosphoric acid or sulfuric acid.

13. A process as claimed in claim 1 wherein the preferred concentration of mineral acid in the reaction medium is between zero $mol/dm^3$ and 1.0 $mol/dm^3$; the concentration of hydrazine hydrate or hydrazine salt in the reaction medium is between 0.01 $mol/dm^3$ and 5.0 $mol/dm^3$; the concentration of halide anions in the reaction medium is between zero $mmol/dm^3$ and 10.0 $mmol/dm^3$; the concentration of the solid catalyst in the reaction medium is between 0.2 $g/dm^3$ and 10 $g/dm^3$; the space velocity of oxygen containing gas is between 500 $cm^3$/g catalyst/h and 10,000 $cm^3$/g catalyst/h; the reaction temperature is between 5° C. and 70° C.; the reaction contact time is between 0.1 h and 5 h; the X in the $N_2H_4.nX$ is $H_2SO_4$, HCl or $H_2O$; the halogen promoter in the catalyst is bromine or chlorine; and the halide anions in the reaction medium are bromide anions or chloride anions.

14. A process as claimed in claim 1 wherein step (i) is carried out in a stirred reactor, bubble column or packed bed reactor, all operated in a batch or continuous mode with respect to the liquid reaction medium.

15. A process as claimed in claim 14 wherein in the continuous operation, the reaction medium is recycled in the reactor.

16. A process as claimed in claim 14 wherein in a stirred or bubble column reactor, the catalyst is in finely powdered form, whereas for a packed bed reactor, the catalyst is in the form of granules of pellets.

17. A process as claimed in claim 1 wherein step (i) is carried out in a trickle bed reactor, with or without recycle of the liquid reaction medium, and wherein the solid catalyst is packed in the reactor and the liquid reaction medium is trickled over the catalyst, while gaseous reactant(s) are passed concurrently or counter-currently with respect to the liquid flow.

18. A process as claimed in claim 1 wherein the hydrazine salt is prepared by reacting hydrazine hydrate with required amount of acid selected from the group consisting of HCl, $H_2SO_4$, HBr, $H_3PO_4$ and $HNO_3$ at room or lower temperature and using directly the resulting mixture for the reaction in step (i).

19. A process as claimed in claim 1 wherein when the adduct X in $N_2H_4.nX$ is an acid then the reaction medium may or may not contain a mineral acid.

20. A process as claimed in claim 1 wherein when the adduct X in $N_2H_4.nX$ is $H_2O$, the the reaction medium contains a mineral acid.

21. A process as claimed in claim 1 wherein step (ii) of the process of this invention is carried out by separating the solid catalyst from the reaction mixture by filtration or centrifugation and then separating the $H_2O_2$ from the liquid reaction mixture by filtration by distillation methods.

22. A process as claimed in claim 1 wherein the hydrazine hydrate or hydrate salt is converted completely, thereby avoiding wastewater treatment for the destruction of hydrazine hydrate or hydrazine salt.

23. A process as claimed in claim 1 wherein the concentration of mineral acid in the reaction medium is between zero mol/dm$^3$ and 1.0 mol/dm$^3$.

24. A process as claimed in claim 1 wherein the concentration of hydrazine hydrate or hydrazine salt in the reaction medium is between 0.01 mol/dm$^3$ and 5.0 mol/dm$^3$.

25. A process as claimed in claim 1 wherein the concentration of halide anions added to the reaction medium is between zero mmol/dm$^3$ 10.0 mmol/dm$^3$.

26. A process as claimed in claim 1 wherein the concentration of the solid catalyst in the reaction medium is between 0.2 g/dm$^3$ and 10 g/dm$^3$.

27. A process as claimed in claim 1 wherein space velocity of oxygen containing gas is between 500 cm$^3$/g catalyst/h and 10,000 cm$^3$/g catalyst/h.

28. A process as claimed in claim 1 wherein reaction temperature is between 5° C. and 70° C.

29. A process as claimed in claim 1 wherein the reaction contact time is between 0.1 h and 5 h.

30. A process as claimed in claim 1 wherein X in the $N_2H_4.nX$ is $H_2SO_4$, HCl or $H_2O$.

31. A process as claimed in claim 1 wherein the halogen promoter in the catalyst is bromine or chlorine.

32. A process as claimed in claim 1 wherein halide anions in the reaction medium are bromide anions or chloride anions.

* * * * *